US010183424B1

(12) United States Patent
Lisso et al.

(10) Patent No.: US 10,183,424 B1
(45) Date of Patent: Jan. 22, 2019

(54) EXPANDED FOAM SHIPPING CONTAINER

(71) Applicant: Amazon Technologies, Inc., Seattle, WA (US)

(72) Inventors: Gregory Karl Lisso, Seattle, WA (US); Jon Stuart Battles, Kirkland, WA (US); John Tan, Bellevue, WA (US); Samuel Christopher Uhlman, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 953 days.

(21) Appl. No.: 14/575,787

(22) Filed: Dec. 18, 2014

(51) Int. Cl.
  *B29C 44/12* (2006.01)
  *B29K 105/04* (2006.01)
  *B65B 43/00* (2006.01)
  *B65B 59/02* (2006.01)
  *B65B 61/18* (2006.01)

(52) U.S. Cl.
  CPC .......... *B29C 44/1266* (2013.01); *B65B 43/00* (2013.01); *B65B 59/02* (2013.01); *B65B 61/182* (2013.01); *B29K 2105/04* (2013.01)

(58) Field of Classification Search
  CPC ... B29C 33/306; B29C 44/12; B29C 44/1266; B29C 44/585; B29C 45/14065; B29C 45/14073; B29C 45/14819; B29C 2045/14942; B29C 45/2673
  USPC .................. 53/472, 139.5; 206/523; 249/88; 264/277.15; 425/330
  See application file for complete search history.

(56) References Cited

U.S. PATENT DOCUMENTS

| | | | | |
|---|---|---|---|---|
| 2,031,786 A | * | 2/1936 | Oldham | B29C 45/14819 425/120 |
| 2,162,563 A | * | 6/1939 | Oldham | B29C 45/14819 264/279 |
| 2,361,348 A | * | 10/1944 | Dickson | B29C 45/14073 264/278 |
| 3,222,843 A | * | 12/1965 | Schneider | B65D 81/113 206/524 |
| 3,419,134 A | | 12/1968 | Fitts | |

(Continued)

OTHER PUBLICATIONS

Web page: Instapak Foam Packaging, published by Sealed Air, copyright 2014 [online][retrieved on Dec. 18, 2014] retrieved from: http://www.sealedairprotects.com/NA/EN/products/foam_packaging/instapak.aspx, 1 page.

(Continued)

*Primary Examiner* — Thanh Truong
*Assistant Examiner* — Patrick Fry
(74) *Attorney, Agent, or Firm* — Lee & Hayes, PC

(57) ABSTRACT

A product to be shipped is placed on a platform. A conveyor belt moves the product and platform toward a packaging station where mold forms at least define a space which encloses the product. Expanding foam is then injected via injector lines into the space. Once the expanding foam has at least partially hardened, the mold forms may be retracted and the package is moved to a next station for at least one of finishing, loading, or storing. The foam thus becomes the shipping package for the product. This eliminates the need to store shipping containers of multiple standardized sizes and shapes, and to fill the standardized shipping containers with dunnage. The mold forms also provide for customized exterior shapes for the shipping package.

20 Claims, 11 Drawing Sheets

(56) References Cited

U.S. PATENT DOCUMENTS

| | | | |
|---|---|---|---|
| 3,485,347 A * | 12/1969 | Talarovich | B29C 44/182 |
| | | | 206/524 |
| 3,642,400 A * | 2/1972 | Theodorsen | B29C 33/00 |
| | | | 249/162 |
| 3,765,991 A * | 10/1973 | Hoffmann | B65C 3/12 |
| | | | 156/230 |
| 3,870,741 A * | 3/1975 | Kuhn | B29C 44/1266 |
| | | | 206/459.5 |
| 3,999,736 A * | 12/1976 | Theodorsen | B29C 33/00 |
| | | | 249/157 |
| 4,030,267 A | 6/1977 | Arnaud | |
| 4,387,066 A * | 6/1983 | Pip | B29C 44/083 |
| | | | 249/160 |
| 4,584,822 A * | 4/1986 | Fielding | B65D 81/113 |
| | | | 53/452 |
| 4,851,286 A * | 7/1989 | Maurice | B32B 5/32 |
| | | | 428/316.6 |
| 4,938,007 A | 7/1990 | Sperry | |
| 5,027,583 A | 7/1991 | Chelak | |
| 5,699,902 A | 12/1997 | Sperry et al. | |
| 5,899,325 A | 5/1999 | Bertram et al. | |
| 5,996,782 A | 12/1999 | Sperry et al. | |
| 6,063,321 A * | 5/2000 | Koyama | B29C 45/14073 |
| | | | 264/272.15 |
| 6,272,813 B1 | 8/2001 | Sperry et al. | |
| 6,279,738 B1 | 8/2001 | Mungo et al. | |
| 6,554,133 B1 | 4/2003 | Kropf et al. | |
| 6,712,201 B1 | 3/2004 | Bertram et al. | |
| 7,077,636 B2 | 7/2006 | Anders et al. | |
| 7,749,419 B2 * | 7/2010 | Kimura | B29C 45/14344 |
| | | | 264/241 |
| 7,788,884 B2 * | 9/2010 | Cheich | B31D 5/0047 |
| | | | 493/464 |
| 8,006,844 B2 | 8/2011 | McKinley et al. | |
| 9,382,399 B2 * | 7/2016 | Liyanage | B29C 44/1261 |
| 2001/0001446 A1 | 5/2001 | Moreyra | |
| 2003/0200111 A1 | 10/2003 | Damji | |
| 2005/0103963 A1 | 5/2005 | Bontrager et al. | |
| 2007/0185613 A1 | 8/2007 | Feldenzer | |
| 2013/0292395 A1 | 11/2013 | Stanley et al. | |
| 2014/0343184 A1 * | 11/2014 | Axelrad | C08J 9/00 |
| | | | 521/180 |
| 2015/0121810 A1 | 5/2015 | Bourgeois | |
| 2015/0125574 A1 | 5/2015 | Arent et al. | |
| 2015/0266652 A1 | 9/2015 | Peppou | |
| 2015/0298885 A1 | 10/2015 | Giller | |

OTHER PUBLICATIONS

Office action for U.S. Appl. No. 14/576,066, dated Dec. 15, 2015, Lisso, "Delivery of Packages by Unmanned Aerial Vehicles", 28 pages.

Office action for U.S. Appl. No. 14/576,066, dated May 13, 2016, Lisso, "Delivery of Packages by Unmanned Aerial Vehicles", 34 pages.

* cited by examiner

EXPANDED FOAM SHIPPING CONTAINER

BACKGROUND

The freight industry utilizes many primary containers for shipments of products around the world—corrugated boxes, padded paper envelopes, poly bags, pallets, and wood, plastic, or metal crates. Each type of container has its own inherent advantages and disadvantages. One common disadvantage is shipping costs. Shipping costs may be affected by several factors including, but not limited to: the distance that the container is being shipped, the weight of the container (including the product), and the volume of the container. Freight haulers generally provide fixed volumes for shipments in their network or system: containers for use on ships, truck trailers, airplane cargo cubes, etc. The volume of something, such as a container, a storage area, or a shipping area, is sometimes referred to as the "cube", which is an abbreviation for "cubic feet." In the shipping industry, a container may be referred to as a container or as a cube. To avoid confusion of terms, and for convenience of discussion herein, a product will be shipped in a package or container, and a package or container will be shipped in a cargo cube.

Often, a shipper pays for an allocated cargo cube, regardless of whether that cargo cube is completely filled with containers or has void spaces. Such a void space is referred to as "shipping air," or "air ship," which is undesirable as it represents unused, but paid for, shipping space. Thus, the cube of any void spaces in a cargo cube represents a significant cost variable. Further, movement of products or containers within a cargo cube can lead to damage to the products, which results in product returns and added costs. To avoid such movement and possible damage, the void spaces are often filled with "dunnage"—a material which fills the voids to provide protection and to reduce movement of the containers within the shipping volume.

Filling the cargo cube with containers minimizes void space and dunnage. Further, a container, although often useful to protect the product, represents a volume that is not being used for the actual product. Shippers are therefore motivated to seek to provide the best fit package for each product so as to minimize void space and the additional volume of the container itself. Ideally, a shipper would have an unlimited portfolio of containers, each container being precisely matched to a particular product so that the cube of the container is as close as possible to the cube of the product itself. Practically, however, the portfolio is limited by many factors, including the price and availability of storage space for multiple sizes of containers, cost and availability of the materials for the containers, and the protective merits of the containers. As a result, shippers are faced with a limited portfolio of shipping container sizes and shapes to ship products. This limited shipping container portfolio often results in higher or excessive "air ship," dunnage requirements, labor (to handle dunnage), disposal cost of the dunnage, and the cube of one container being too small or of the wrong shape for the product, and the next larger size or usable shape container resulting in void space in the container and an excessive container cube considering the cube of the actual product. Also, if the available container is oversized for the product, then the void space in the container will be filled with dunnage to prevent movement of, and damage to, the product within the container. One method of filling the void space in a container is using expanding foam dunnage: the product is placed in the shipping container, and then expanding foam is placed in the container to fill the voids in the container and prevent movement of the product within the container.

DETAILED DESCRIPTION

Figure 1:
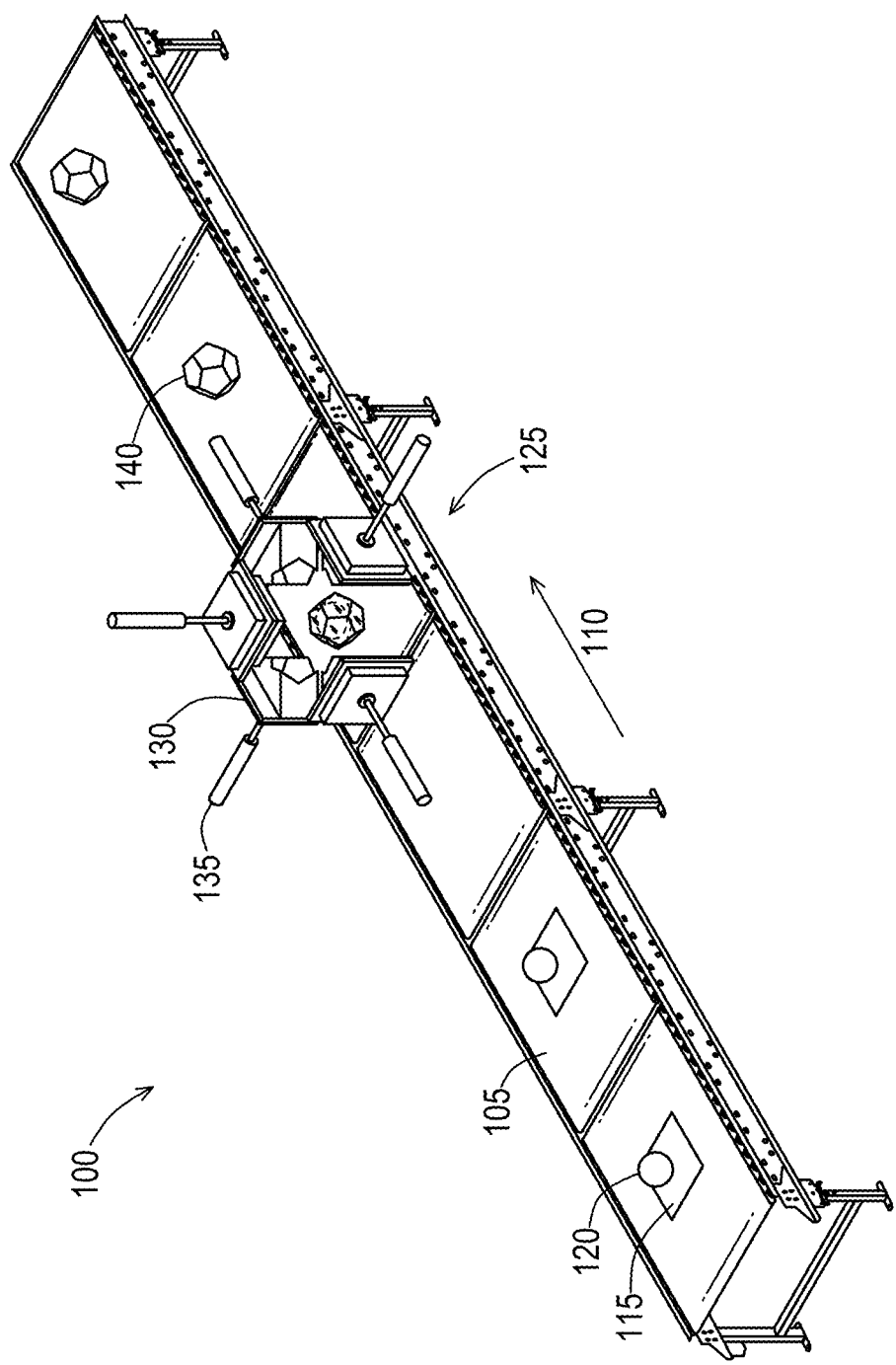
FIG. 1 is an illustration of an exemplary apparatus to package a product for shipment.

As described herein, expanding foam is not used as dunnage in a shipping container but is used as the actual shipping container. Further, the expanding foam also provides that the resulting container size and/or shape is or may be customized for a product. In addition, the use of expanding foam in the manner described herein effectively provides for a large number of available shipping containers, rather than the limited portfolio of standard size shipping containers conventionally available. The expanding foam may be, for example, a plastic-based expanding foam. Expanding foam based on other materials, such as but not limited to organic-based materials, may also be used if the expanding foam provides the appropriate protection characteristics for the product. Appropriate protection characteristics may include shock absorption, shock distribution, temperature maintenance or insulation, light transmission or reflectance, air resistance or permeability, moisture and water resistance, and moisture and water impermeability, among others.

In one method, a product is placed on a platform or mold form, and then other mold forms are advanced toward the product. The mold forms may have an interior surface shaped to provide a desired package shape. Expanding foam is then injected via apertures in one or more of the mold forms. The product is thereby enclosed within the foam. Once the foam has at least partially hardened, the mold forms are removed or retracted. The foam then constitutes the package for the product. The package, with the enclosed product, may then be moved to a next station, which may be, for example, a finishing station, for example, a trimming station, a poly wrap station, or a label printing station, to a loading station, or to a holding station, among others. The use of expanding foam as the package, instead of as dunnage within the package, thus provides for convenient customization of a package for a particular product and eliminates the need to store multiple sizes and shapes of packages to accommodate products with different sizes and shapes.

In another method, an expanding foam packet is placed in a first mold form, such as a bottom mold form. The expanding foam packet is activated and a product is placed on the expanding foam packet. The expanding foam packet then begins to expand around the bottom and sides of the product. Another expanding foam packet is then placed on top of the product and activated, and another mold, such as a top mold form, is advanced toward the bottom mold form. The expanding foam packet placed on top then begins to expand around the top and sides of the product. The mold forms may have an interior surface shaped to provide a desired package shape. Once the foam has at least partially hardened, the mold forms are removed or retracted. The bottom mold form and the top mold form may meet if the size of the product is small. Again, the foam constitutes the package for the product. The package, with the enclosed product, may then be moved to a next station, which may be, for example, a finishing station, a loading station, or a holding station, among others. The use of one or more expanding foam packets as the package, instead of as dunnage within the package, thus again provides for convenient customization of a package for a particular product and eliminates the need to store multiple sizes and shapes of packages to accommodate products with different sizes and shapes.

FIG. 1 is an illustration of an exemplary apparatus 100 to package a product 120 for shipment. The apparatus 100 includes a series of conveyor belts 105 which move the product 120 in the direction shown by arrow 110. A product 120 to be packaged is placed on a foam platform 115. When the product 120 arrives at the packaging station 125 the mold forms 130 (also sometimes referred to herein as mold plates 130) are advanced to close around the product 120. Expanding foam is then forced through the injector lines 135 (only partially depicted for clarity and convenience of illustration) through holes or apertures in the mold forms 130. Such holes or apertures are shown as 315 in FIG. 3. The mold forms 130 may be held in the advanced position if the minimum size container is desired. If a larger size container is desired, such as for a larger product 120, then the mold forms 130 may be retracted as the expanding foam is being injected. The resulting package 140, with the product 120 enclosed therein, is then carried by the conveyor belt 105 to a next station, which may be, for example, a finishing station, a loading station, or a holding station, among others. For clarity and convenience of illustration, other parts of the apparatus such as actuators, arms, controllers, motors, drives, pumps, compressors, hydraulic or pneumatic lines, etc., that move or control the product or the mold forms are not shown.

The platform 115 on which the product 120 initially rests may be relatively flat or may be in the form of a pedestal. The platform 115 may be left behind when the mold forms advance, or may become part of the package 140. Pneumatic or electric drives, which are not shown, are used to operate the conveyor belt 105, advance and retract the mold plates 130, and force the expanding foam through the injector lines 135. A control system may be used to control the sequencing of the operations, as described below with respect to FIG. 4.

As shown, the product 120 is initially placed on a foam platform 115. In one implementation the product 120 may be lifted off of the platform 115 by the mold forms 130 as they are advanced. In another implementation the platform 115 may become part of the package 140. In yet another implementation, not shown, the product 120 may be initially placed on a bottom mold form 130. In yet another implementation, one or more of the mold plates may be used for shaping but not used for injection of the expanding foam, and therefore will not have the holes or apertures 315. In yet another implementation, the mold forms 130 may be retracted at different rates at the same time or at different times so as to achieve a desired shape for the package 140. Alternatively, or additionally, the mold forms may be retracted to different distances from the product at different times so as to achieve a desired shape for the package 140. Further, alternatively or additionally, the injection of the expanding foam and the refraction of the mold forms 130 may occur in stages, until the desired size or shape of the package 140 is obtained.

Figure 2:
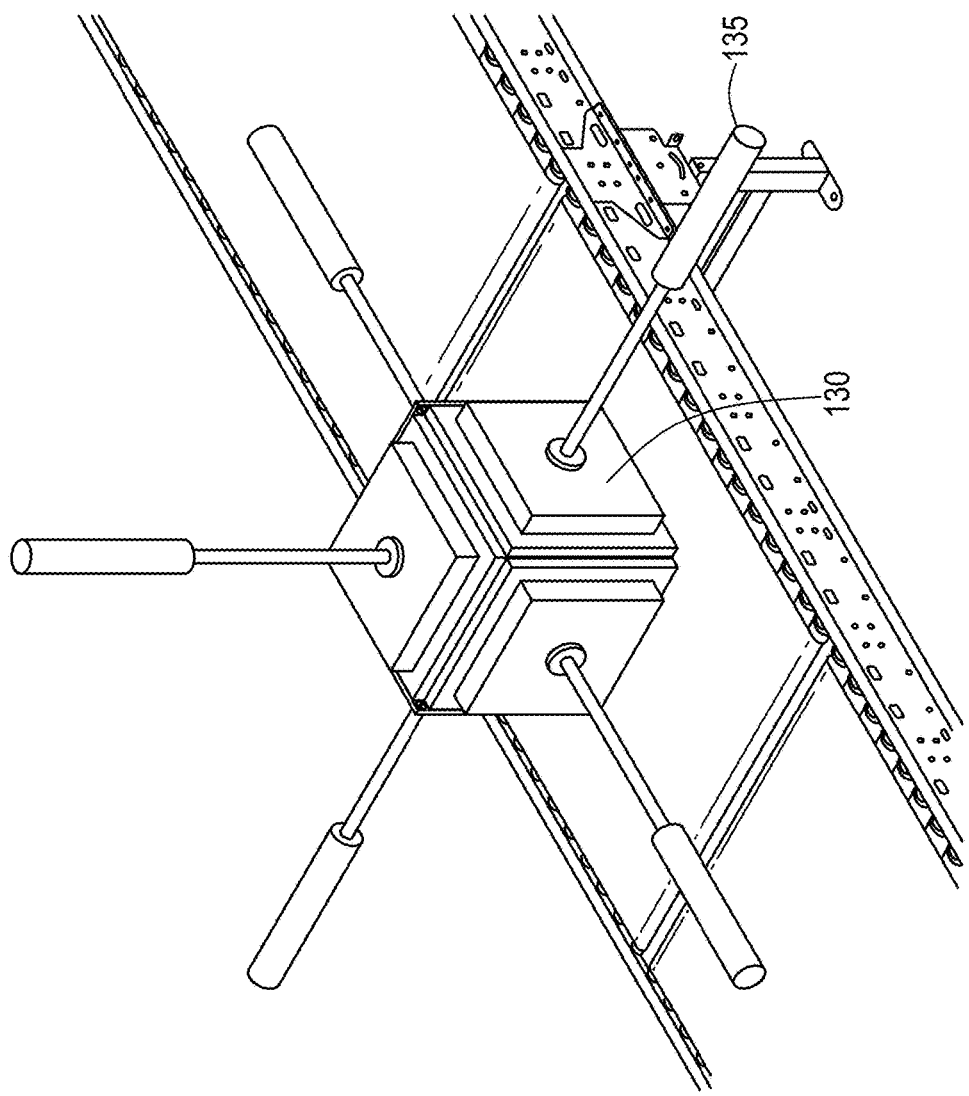
FIG. 2 is an illustration of the mold forms of FIG. 1 in the advanced or closed position.

FIG. 2 is an illustration of the mold forms 130 in a fully advanced or closed position. An expanding foam injection line 135 is also shown. As shown, the mold forms 130 may be advanced such that they contact each other to form a sealed volume, and then the expanding foam is injected. Larger mold forms 130 may be used if the product 120 is larger. Thus, different sets of mold forms may be used to accommodate different sizes of products 120. Further, if the product 120 is a different shape, such as rectangular, or square, or if a different shape package is desired for some reason, then different sets of mold forms may be used to provide for the different desired shapes. For example, the mold forms may be rectangular rather than square.

Further, the inside surface of the mold forms 130 may be customized to provide for a desired shape of a package 140, which may be the same as, or different than, the shape of the product 120. For example, the product 120 shown is in the shape of a sphere, so the inside surfaces of the mold forms 130 may be shaped to form a package in the shape of a sphere. In the illustration shown, however, the inside surfaces of the mold forms 130 are shaped to form a package 140 in the shape of a polyhedron. Thus, the shape of the package 140 may be customized to perform a particular function, or even to provide a decorative look. For example, the mold forms 130 may be customized to provide a package 140 having the shape of a wine bottle, even if the product 120 is not a wine bottle. For example, the product 120 might be a ball, or a pencil, or a bag of candy, but the package 140 may be in the shape of a wine bottle for amusement, celebratory, or decorative purposes.

As another example, when the products are being selected to be placed in a cargo cube, it may be determined that a void remains if the various products are packaged with a minimum foam thickness. Rather than introducing dunnage into the cargo cube, the thickness of the package of one or more of the products may be increased, and/or the shape of the package for one or more of the products may be altered, so as to use up the cargo cube. This minimizes or eliminates the need for dunnage. The selection of products, the thickness of the package, and/or the shape of the package may be performed automatically by the controller. For example, after the initial selection of the products and the initial selection of the thickness of the various packages, it may be determined that a void remains which is large enough to accommodate a package containing a book, but there are no more books to be shipped. There may be, however, a set of artistic pencils to be shipped, which do not require that much volume. That set of pencils may, however, be enclosed in a package which is in the size and shape of a package that could enclose a book. Thus, dunnage is avoided.

If the product 120 is so large that a particular set of mold forms 130 do not close around the product 120, then another, larger set of mold forms 130 may be used. In another implementation, however, the same set of forms is used and the process begins as above, with the mold forms 130 advanced to contact, or nearly contact, the product 120, but then one or more of the mold forms 130 are retracted and more expanding foam is injected as the one or more mold forms 130 are retracted. Thus, a set of mold forms 130 may be used for more than one size product, even if they may not enclose larger products 120.

Further, the package 140 may be, but need not be, symmetrical. In the example shown, the mold forms 130 are the same, so the package 140 is symmetrical. The mold forms 130 may be different if desired, such as to accommodate a different shape of product 120. For example, the side and top mold forms 130 may be rectangular so that the package is a cuboid. Also, a mold plate may have two or more injection lines 135, such as where the mold form 130 is rectangular, or where the mold form 130 is sufficiently large such that two or more injection lines 135 are used to achieve a uniform injection of expanding foam and avoid thin spots and voids.

Although FIGS. 1 and 2 show the use of five mold forms 130, fewer mold forms 130 may be used. For example, for a package in the shape of a wine bottle, there might only be two mold forms 130, one mold form having an interior surface in the shape of one-half of a wine bottle, and the other mold form having an interior surface in the shape of the other half of the wine bottle. In this example each mold form might have two or more injection lines 135. The product 120, however, might be in the shape of a wine bottle, or a ball, or a pencil, a flashlight, etc. The product 120 may be placed on one mold form, the other mold form advanced, and then the expanding foam injected, possibly first via one mold form and then via the other mold form.

Figure 3:
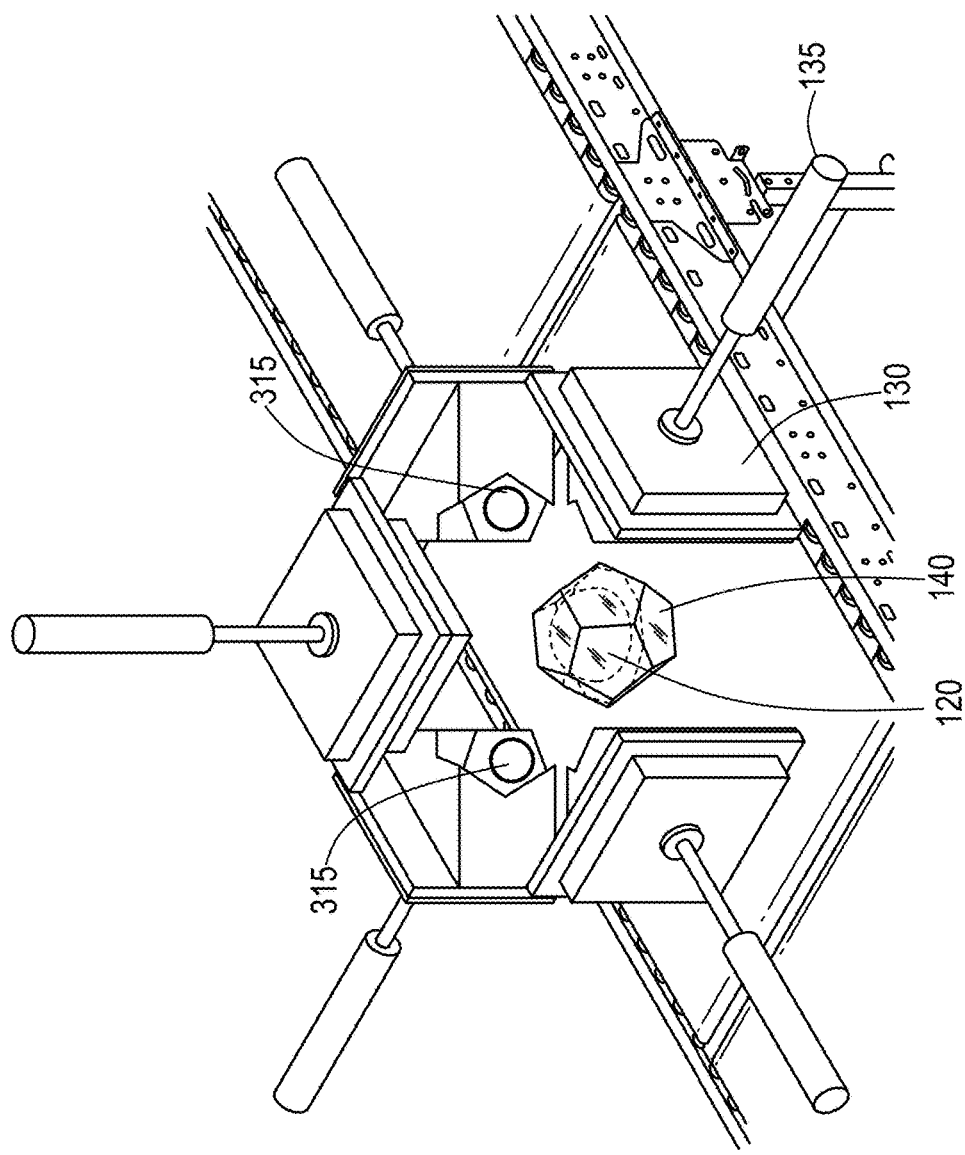
FIG. 3 is an illustration of the mold forms of FIG. 1 in a retracted or open position.

FIG. 3 is an illustration of the mold forms 130 in an at least partially retracted or open position and showing the resulting package 140. Although the expanding foam is generally opaque it is shown as being partially transparent for convenience of illustration, so that the product 120 may be seen as being enclosed within the package 140. Also shown are exemplary holes or apertures 315 in the mold forms 130. The size of the holes 315 is exaggerated for convenience in viewing.

Figure 4A:
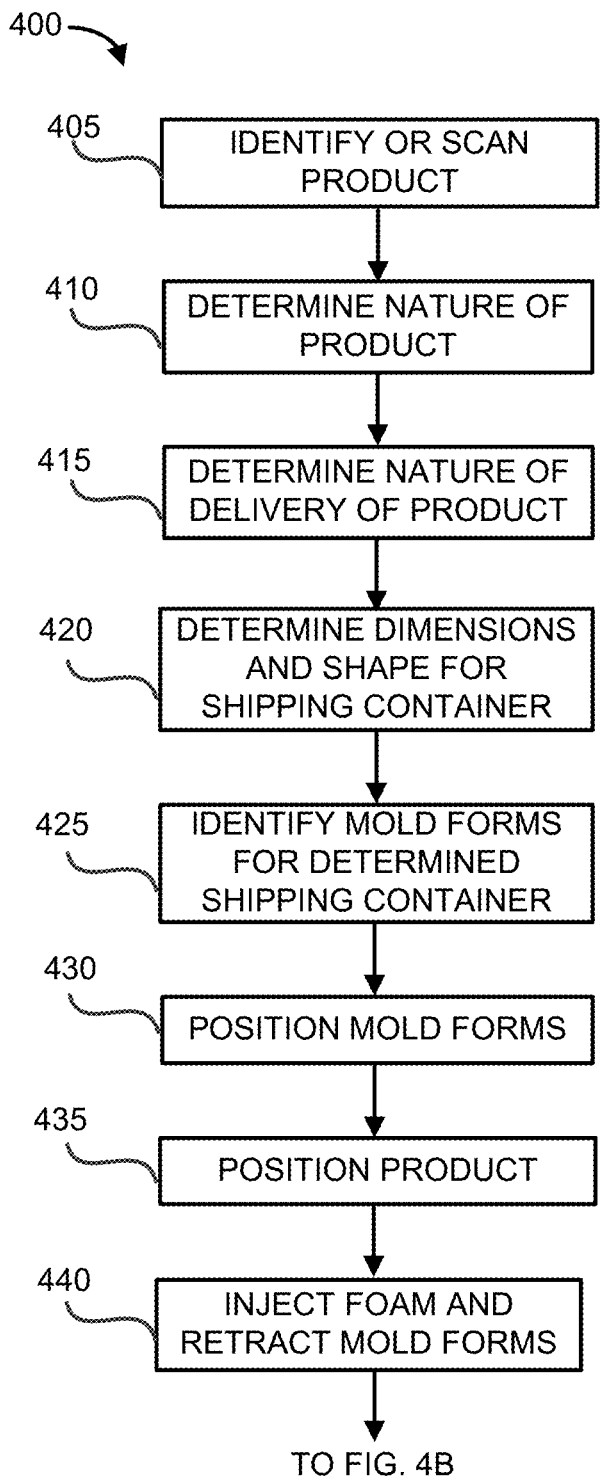
FIGS. 4A and 4B are a flowchart of an exemplary method of packaging a product for shipment.
Figure 4B:
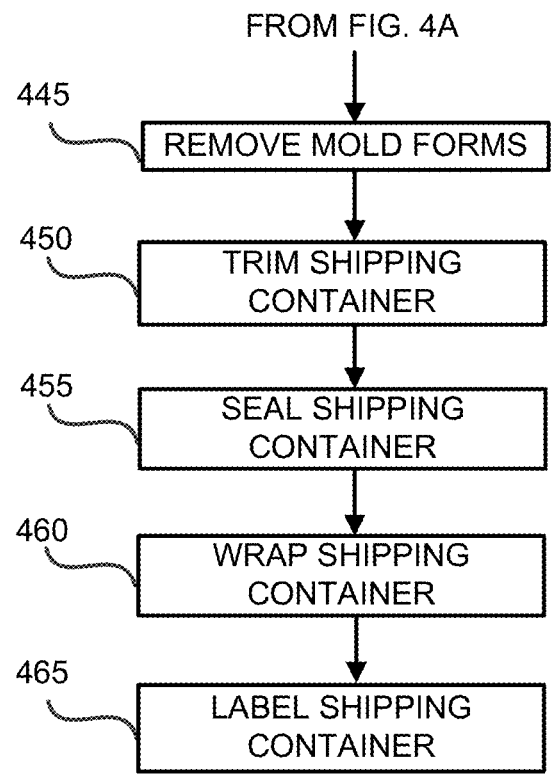

FIGS. 4A and 4B are a flowchart of an exemplary method 400 of packaging a product 120 for shipment. A control system may be programmed to perform the various steps discussed herein. The product is identified or scanned at 405 to obtain the dimensions of the product. If the product has, for example, a bar code or a radio frequency identification (RFID) tag or other identifier, then the information from the bar code, RFID tag or other identifier could be used to identify the product. A database may be consulted to determine the dimensions of the product. If a bar code, RFID tag or other identifier was not available, or if the product dimensions were not in the database, then the product could be scanned, such as by a laser or other methods, to determine the dimensions of the product.

The nature of the product is determined at 410. The nature of the product may be, for example, whether the product is perishable, whether the product should be protected from outside temperatures, light, air, water, etc., the fragility of the product, whether the product should be shipped upright or in some other predetermined position, etc. These factors may affect the thickness of the packaging and/or the distribution of the thickness of the packaging. This may be obtained from a database based upon, for example, the bar code, the RFID tag or other identifier.

The nature of the delivery of the product is determined 415. For example, is the product to be delivered to a door step by a human being, or air dropped from an unmanned aerial vehicle (e.g., a drone)? This factor may be determined from the order for the product, by the delivery location of the product (e.g., a back yard, or a swimming pool), from the bar code, RFID tag or other identifier, or by some other method. This factor may also affect the thickness, size, shape, and/or material of the packaging.

The dimensions and shape for the shipping container are determined at 420 based upon one or more of the factors mentioned above. For example, if the product is a book to be manually delivered to a door step, then the thickness of the shipping container may be the minimum thickness appropriate to protect the product 120 during normal shipping and handling operations. If, however, the product is a personal electronics device to be air dropped to a driveway at the rear of the customer's house, then the thickness of the shipping container will be greater in order to protect the product during delivery. Or, if the product is a perishable item that needs to be protected from outside temperatures and/or other elements, then the thickness of the shipping container will be greater to provide such protection. For example, the packaging for an ice cream cake to be delivered as a surprise to a birthday party in Florida in August will have a greater thickness than the packaging if delivered in February. The shape of shipping container may be determined based on one or more of these factors or on other factors. For example, if the product is a bottle containing a liquid, then the shipping container may be in the shape of a cylinder. As another example, if the product is a book then the shipping container may be rectangular. Other factors may also be included, such as whether the product should be shipped, or landed, in an upright position, whether the center of gravity should be higher or lower, whether a weight, for example, a metal or ceramic plate, is to be used to assure an upright position for shipping or landing, whether a decorative or novel package has been ordered, whether any particular attachments, such as eyelets, are required for the shipping container, whether the package should be shaped for ease of product removal, etc.

The mold forms for the shipping container are identified 425. Some mold forms may be usable for more than one shipping container shape. For example, a square mold form is usable with both cubical and some rectangular shapes, such as a cuboid. As another example, a triangular mold form is usable for both a pyramid and for a triangular prism. Other mold forms and corresponding shapes are also possible.

The mold forms are positioned at 430. For example, the bottom mold form and any side or top mold forms may be placed into position, or just a bottom mold form may be placed into position.

The product is positioned at 435, such as by placing it on a bottom mold form, a platform, or a pedestal. If a weight is desired to achieve a desired center of gravity or package orientation, then the weight may be placed on the bottom mold form, platform, or pedestal and then the product placed on the weight. Foam or other pads may be inserted between the weight and the product to keep them from contacting or rubbing against each other. Also, spacers may be inserted between the weight and the product, and the expanding foam allowed to fill the gap created by the spacers, to keep the weight and the product from contacting or rubbing against each other.

Expanding foam is injected at 440 via injection lines 135 through the holes or apertures 315 in the mold forms. The product is therefore enveloped by the expanding foam. The mold forms may be held in place or may be retracted as the foam expands until the shipping container has reached the determined size. The rate of injection via each aperture and the sequencing of the injections affect the final position of the product in the shipping package. For example, if it is desired that the product be higher in the shipping package, for example, to product for more cushioning or protection on the bottom of the product, expanding foam would be injected at the bottom first and then, after a period of time, the expanding foam would be injected at the sides and/or top. If it is desired that the product be lower in the package, for example, to lower the center of gravity, the expanding foam would be injected at the top first and then, after a period of time, the expanding foam would be injected at the bottom and/or the bottom plate not retracted as much as the top plate.

Optionally, prior to the foam being injected at 440, or prior to an expanding foam packet being activated (as described below with respect to FIG. 5), the product 120 may be surrounded by a tape or string, not shown, with one end being placed so as to protrude from the package 140. The customer can then grab the protruding end and pull it to tear through the foam and separate the package into two or more pieces so that the customer can retrieve the product 120.

The mold forms are at least partially retracted or removed at 445. In some cases, where the mold form has been retracted during formation of the package, this may simply mean continuing to retract the mold form until it has reached its most retracted position. Retracting the mold forms while the expanding foam is expanding may create a gap between one mold form and the next, and the foam may partially expand into that gap. As a result, the expanded foam is the shipping package or container, and the mold forms are not the shipping container.

The shipping container may be trimmed at 450 to remove any excess foam or flashing. Mechanisms and methods, for example, blades and grinding wheels, for removing excess material, such as flashing, are known and are not described herein.

The shipping container may be sealed at 455. The foam injection process generally provides a sealed package and further sealing is not necessary. In an alternative implementation, described with respect to FIG. 5 below, an expandable foam packet is used rather than foam injection. The foam packets may not provide the desired sealing. If further sealing is appropriate, then tape, for example, a moisture impermeable plastic tape, is applied to the seams. In another implementation, hot glue or other adhesive may be placed on the seam between two foam packets, or may be injected at various points on the seam. For example, before the second foam packet is placed into position, glue or other adhesive may be applied to one or both of the foam packets so that the packets are sealed together.

The shipping container may be wrapped at 460, if appropriate, in a waterproof plastic wrap, such as a poly wrap. Although the foam packaging provides for a sealed container, poly wrap may provide an additional degree of protection, such as where the package is to be dropped into a swimming pool, or where the package may be delivered to a location that is not protected from a heavy rain.

The shipping container may be labeled at 465, such as by printing information onto the poly wrap. The exterior poly wrap may provide a better surface than foam for applying labeling to the package. Such labeling may include information about the product or package, for example, one or more of the customer name, customer address, shipper name, shipper address, an identification number, the weight, a bar code, etc. The information on the exterior poly wrap may also include an advertisement, etc. Further, customized or personalized information may be printed on the poly wrap such as, for example, a birthday or anniversary greeting or decoration.

At this point the shipping container, with the product inside, and any desired labeling affixed thereto, may be loaded onto the shipping or delivery vehicle, or held for the next available vehicle.

Figure 5:
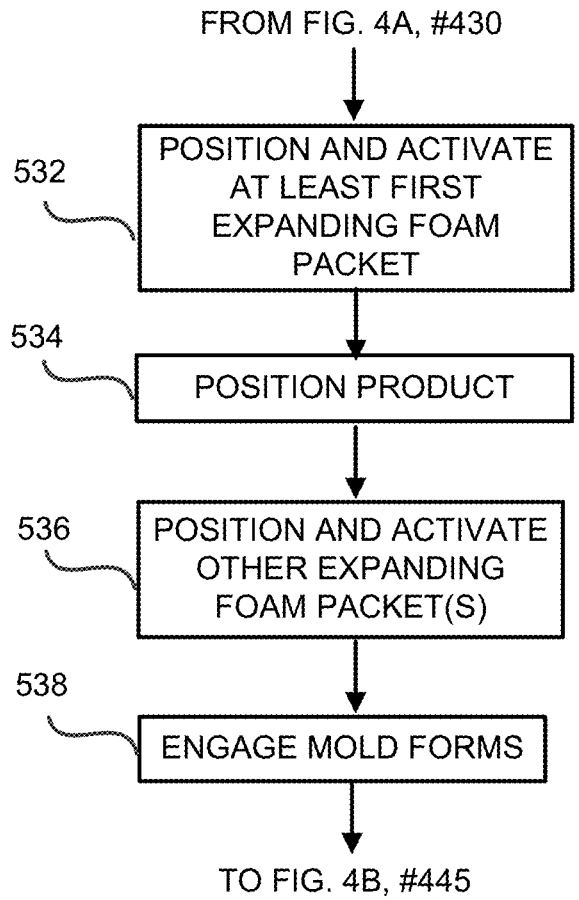
FIG. 5 is a partial flowchart of another exemplary method of packaging a product for shipment.
Figure 6:
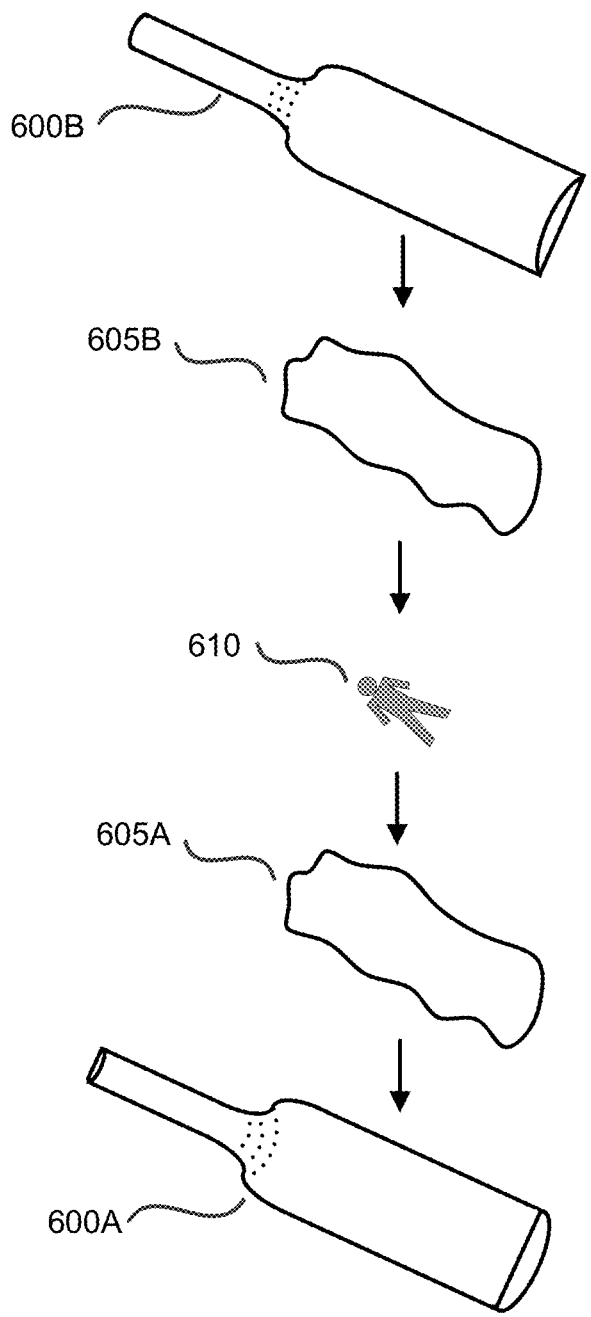
FIG. 6 is an illustration of the exemplary method of FIG. 5.

FIG. 5 is a partial flowchart of another exemplary method of packaging a product for shipment, and FIG. 6 is an illustration of the exemplary method of FIG. 5. In the implementations shown by FIGS. 5 and 6, steps 435 and 440 of FIG. 4A are replaced by steps 532, 534, 536, and 538 of FIG. 5.

Generally, at least two mold forms 600A and 600B will be used, collectively referred to herein as mold forms 600, one mold form 600A being used to provide the shape of the lower part of the package, and the other mold form 600B being used to provide the shape of the upper part of the package. As an example of novelty packaging, the mold forms 600 form the shape of a wine bottle even though the product 610 is a doll toy. Other shapes, novelty, functional, or both, can also be provided by the mold forms. After the mold forms 600 are positioned as in step 430 of FIG. 4A, at least a first expanding foam packet 605A is positioned and activated at 532. There will generally be at least two expanding foam packets used, one lower packet 605A and one upper packet 605B. There may be several expanding foam packets 605 depending upon the shape of the product and how thick the foam should be to properly protect the product. Expanding foam packets 605 are commercially available. Typically, an expanding foam packet 605 is activated by twisting or massaging the packet 605 to break a seal between two different compartments in the packet to allow the two different chemical components to mix, and preferably twisting or massaging the packet somewhat after that point to ensure an even distribution of the chemicals.

The product 610 is positioned at 534 on at least one expanding foam packet 605. Other expanding foam packets 605 are placed on top of the product 610 and activated at 536. The sequence of activation and the delay time between activations affect the final position of the product in the shipping package. For example, if it is desired that the product be higher in the shipping package, for example, to provide for more cushioning or protection on the bottom of the product, the lower expanding foam packet would be activated first and then, after a period of time, the upper expanding foam packet would be activated. If it is desired that the product be lower in the package, for example, to lower the center of gravity, the lower expanding foam packet could be activated first, the product placed top down onto the lower expanding foam packet, and then, after a period of time, the upper expanding foam packet could be activated. The final shipping package would then be rotated so that the product was top side up.

The mold forms are engaged at 538. In one embodiment the mold forms are retracted as the foam expands. In another embodiment only the mold form on a particular side is retracted so that the thickness of the foam is different on that side. In another embodiment mold forms on different sides are refracted at different times and/or rates to achieve customized foam thicknesses on different sides. The process then continues at 445 of FIG. 4B.

Thus, as described above, expanding foam is used as a shipping container, the resulting container size and/or shape may be customized for the product, the interior and the exterior of the package may be customized, and mold forms may be used, rather than standardized containers, which reduces or eliminates storage space and costs for storage of the standardized containers.

For convenience of discussion, the above description refers to a single product being packaged. Multiple products may, however, be in a single package. For example, if a book, a tablet computer, and a DVD are all to be delivered to the same location, then they may all be enclosed in a single expanding foam package, rather than being packaged individually. Foam or other pads may be inserted between the products to keep the products from contacting or rubbing against each other. Also, spacers may be inserted between the products, and the expanding foam allowed to fill the gap created by the spacers, to keep the products from contacting or rubbing against each other. The controller may refer to packaging tables to determine the placement of the various products. For example, the book may be on the bottom, the tablet computer next, and the DVD on top.

Figure 7:
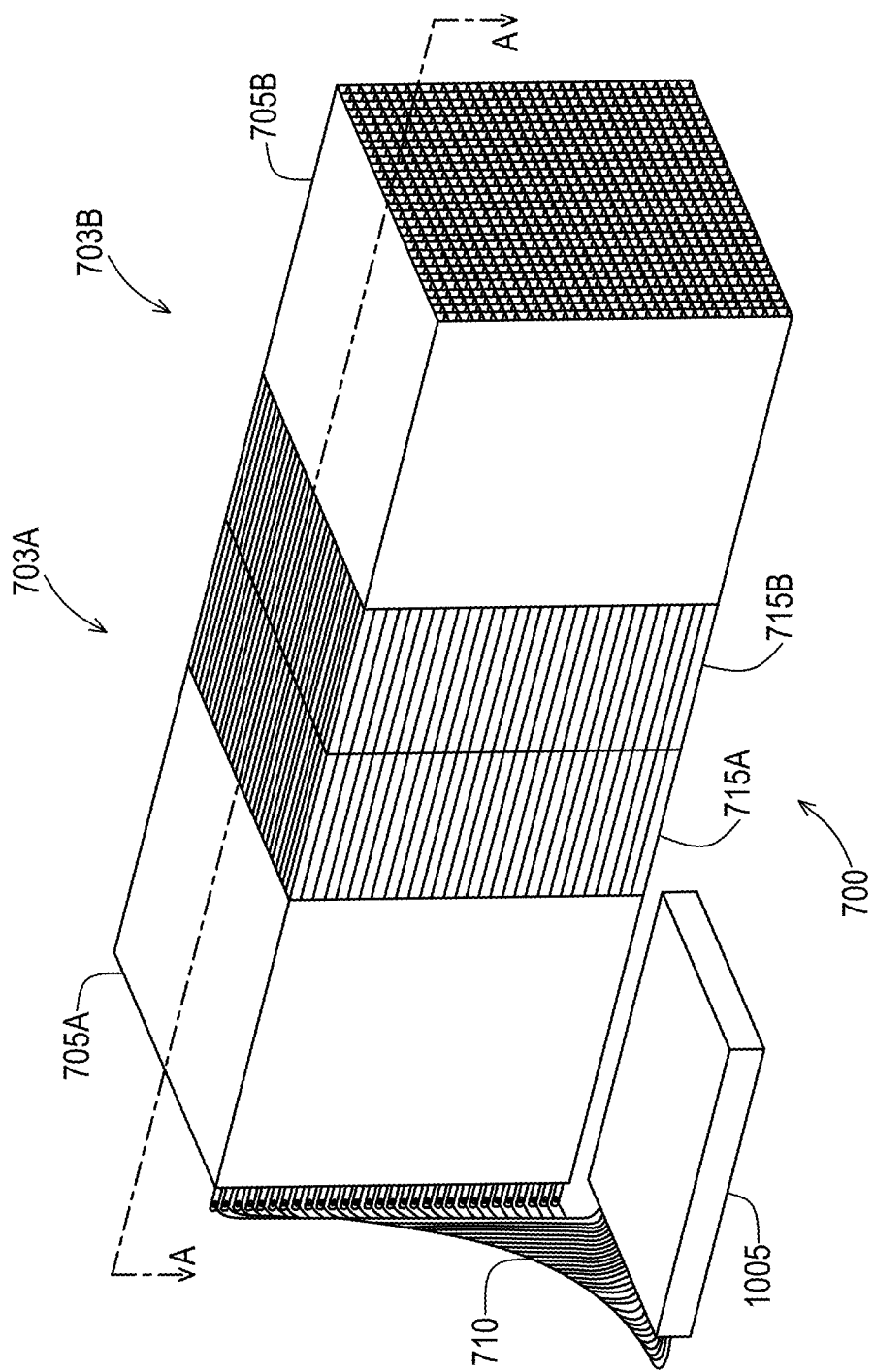
FIG. 7 is an illustration of another exemplary apparatus to package a product.

FIG. 7 is an illustration of another exemplary apparatus 700 to package a product. Two large pin matrix blocks 703A, 703B are used as the moveable mold forms, each block 703A, 703B comprises mold form shells 705A, 705B, and moveable pins 715A, 715B. Mold form shells 705A and 705B each contain a plurality of pins 715A and 715B, respectively. Actuators (not shown) in, or external to, the mold form shells 705A and 705B control the positions of the pins 715A and 715B. The pins 715A and 715B may be fully extended from the mold form shells 705A and 705B, fully retracted into the mold form shells 705A and 705B, or placed in any desired intermediate position. Further, the pins 715A and 715B are preferably individually controllable. The pins 715A and 715B may be solid, may be hollow cylinders so that expanding foam may be injected through them, or some may be solid and others may be hollow, as desired or as appropriate for a particular implementation. The hollow pins may be considered as being apertures for the injection of the expanding foam. A controller 1005 (discussed below with respect to FIG. 10) is connected to mold form shells 705A and 705B, and pins 715A and 715B, by a conductor cable 710, which conveys pin position instructions from the controller 1005. For clarity and convenience of illustration, other parts of the apparatus such as actuators, arms, controllers, motors, drives, pumps, compressors, hydraulic or pneumatic lines, etc., that move or control the product 120, mold form shells 705A and 705B and pins 715A and 715B are not shown.

Figure 8:
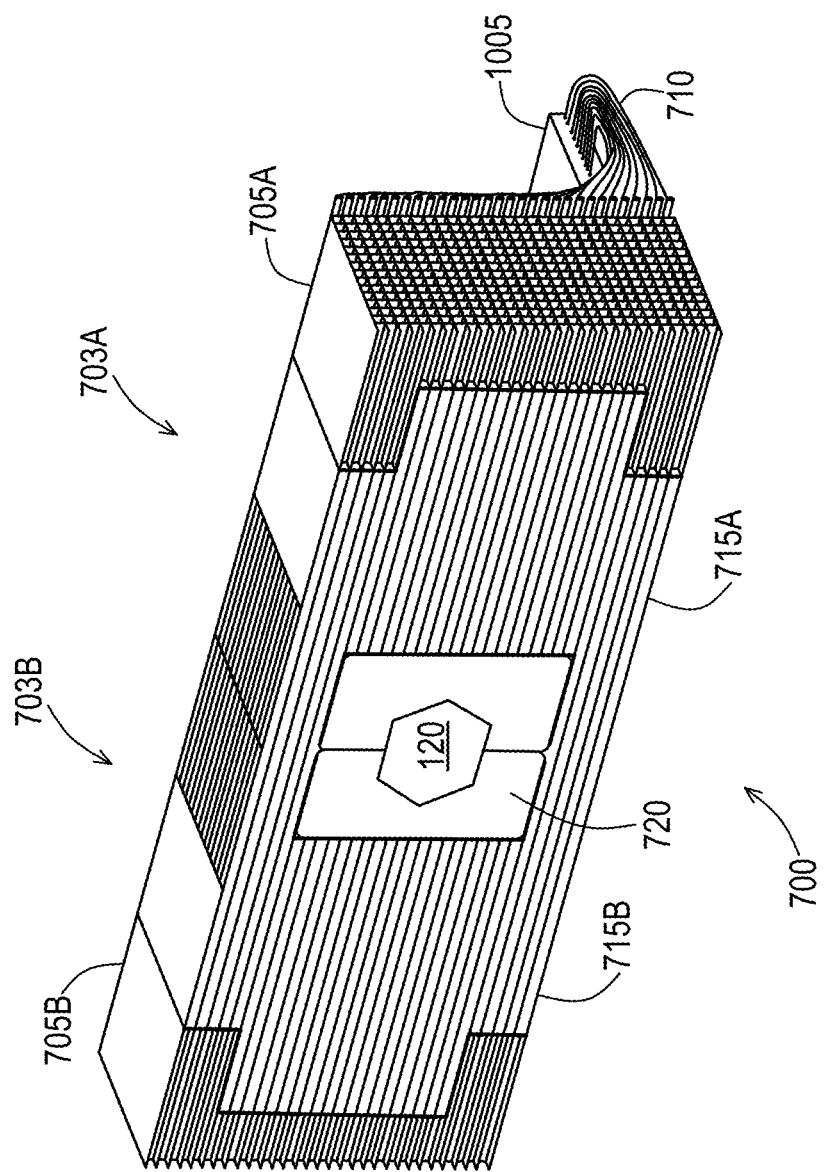
FIG. 8 is a cross-sectional view of the exemplary apparatus of FIG. 7 along lines A-A.

FIG. 8 is a cross-sectional view of the exemplary apparatus 700 of FIG. 7 along lines A-A. The product 120 is shown as already being partially enclosed within the expanding foam packaging 720. In FIG. 8, the pins 715A, 715B are shown in an advanced position so that one or more of the pins support and position the product 120. Some pins 715A, 715B may be solid so as to support and position the product 120 or to define the package shape, and other pins 715A, 715B may be hollow for injection of the expanding foam. Of course, if the product 120 is light enough, or if the pins 715A, 715B are strong enough, then hollow pins could be used to support and position the product 120 as well as for the injection of the expanding foam. Alternatively, a pad or platform, as in FIG. 1, may be used to support and position the product 120. As another implementation, a pin or pins (not shown) could extend vertically and/or horizontally between the pins 715A and 715B to support and/or position the product 120.

From their advanced or extended positions, the pins 715A, 715B may be retracted as the expanding foam is injected. The pins 715A, 715B may all be refracted at the same rate, in which case the expanding foam will have an external shape similar to that of the product 120, or the pins 715A, 715B may be retracted at different rates, at different times, in different amounts, so as to customize the external shape of the expanding foam. Matrix blocks 703A, 703B thus provide for both a self-conforming mold which automatically conforms the package to the shape of the product 120, and for a custom mold which forms a package having a shape that is different than the shape of the product 120. The shape of a package may be determined from an identification of the product 120, from a scan of the product 120, from a customer request for a specific or customized shape, from the shape of a space that is currently available and unfilled in a cargo cube, etc. Thus, the shape of a package is not limited to being derived from the shape of the product. For example, the shape of the package may be spherical, cubical, cuboid, cylindrical, or triangular (prism, or pyramid), among others. Further, there may be two or more sets of matrix blocks 703A, 703B to accommodate different size products or different size package requirements.

Figure 9:
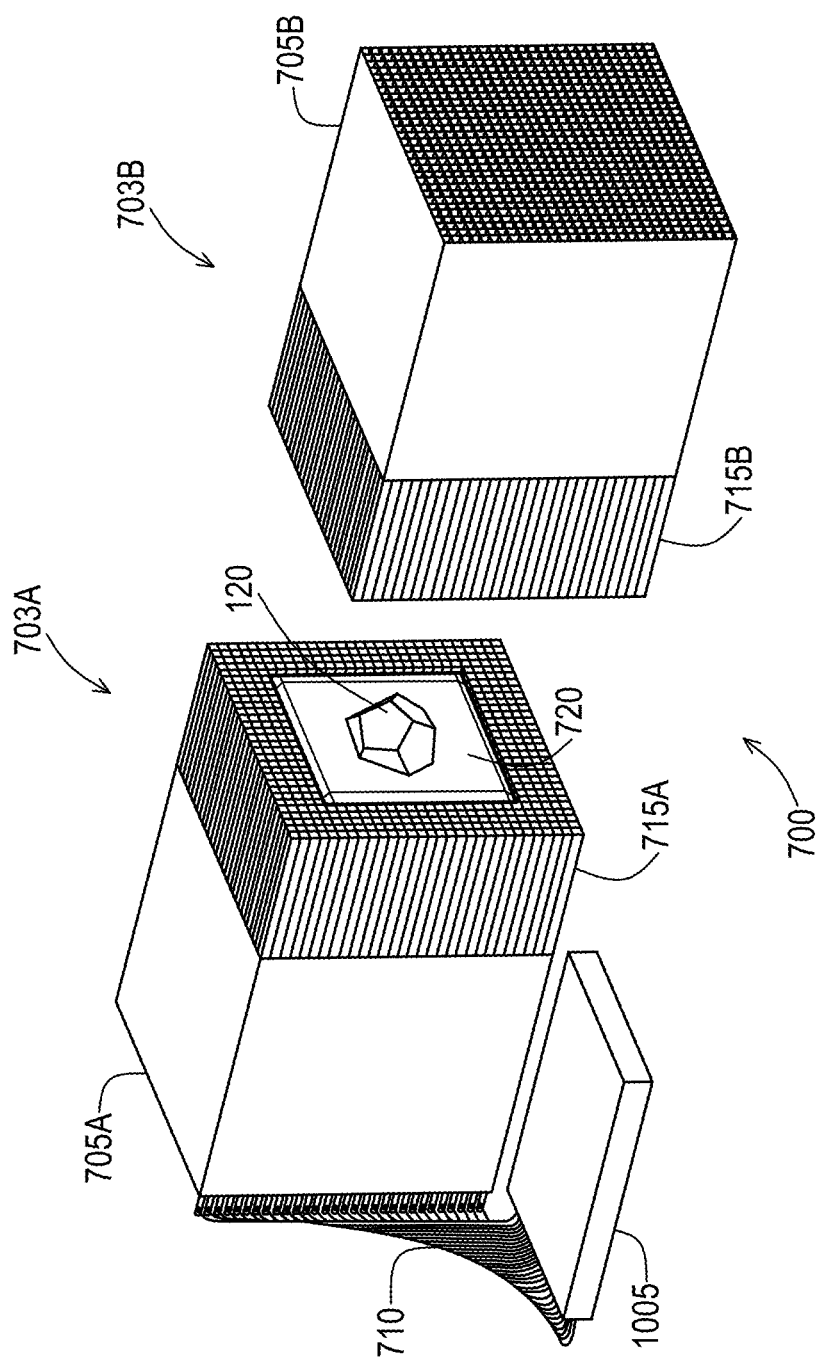
FIG. 9 is another illustration of the exemplary apparatus of FIG. 7.

FIG. 9 is another illustration of the exemplary apparatus 700 of FIG. 7. In this partially cross-sectional illustration, the packaging has been completed and the product 120 is shown as being enclosed in the package 720 (via the cutaway view). Also, the pins 715A, 715B has been retracted. The package 720, with the product 120 inside, may then be removed from the apparatus 700 by any convenient means. For example, the pins 715A behind the package 720 may be advanced to push the package 720 out of the molding form shell 705A. Further, the mold forms 703A, 703B may be moveable, such as to retract to allow for convenient removal of the packaged product and placement of the next product to be packaged.

The product 120 would be positioned between the blocks 703A, 703B (or the blocks 703A, 703B positioned around the product 120). The pins 715A, 715B are advanced to determine the shape and dimensions of the product such as, for example, by advancing the pins 715A, 715B until resistance is felt due to the pins contacting the product 120. Expanding foam is then injected through one, some, or all of the pins. The pins are then retracted to give the desired external shape for the package. The blocks 703A, 703B are then separated, and the package 720 containing the product 120 is released. Thus, although blocks 703A, 703B, mold form shells 705A, 705B, and pins 715A, 715B are used, the process of packaging the product 120 is substantially as shown in FIGS. 4A and 4B.

The number, length, diameter, aperture size, number of pins with an aperture, rigidity, strength, and thickness of the pins 715A, 715B will depend upon such factors as the resolution desired (more pins for a higher shape resolution), the size of the product, the weight of the product, the desired shape, the desired rate of injection, etc.

Figure 10:
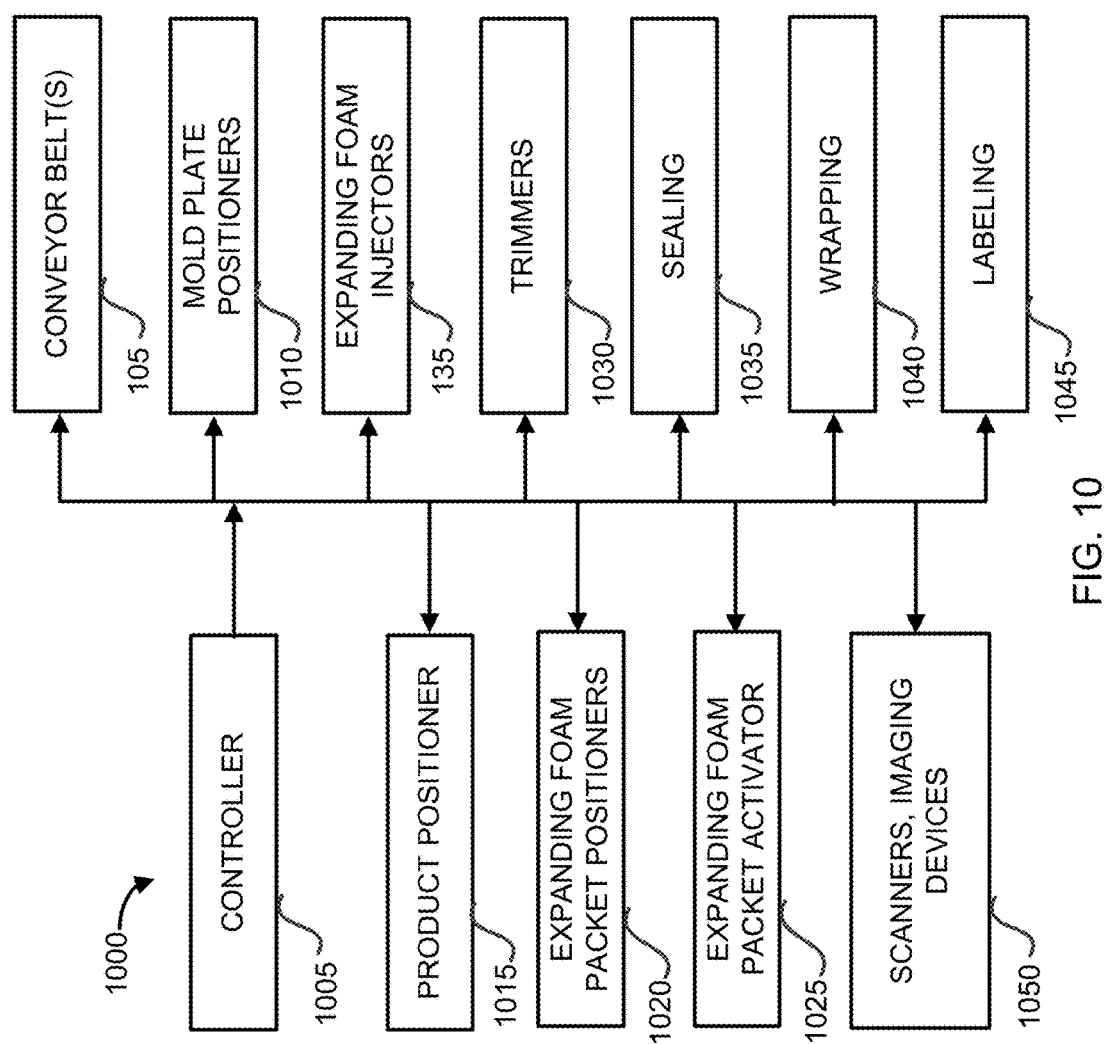
FIG. 10 is a block diagram of an exemplary control system 1000.

FIG. 10 is a block diagram of an exemplary control system 1000. A controller 1005 monitors and controls the operation of various other components, for example, the conveyor belt(s) 105, mold plate 130 positioners 1010, product positioner 1015, expanding foam injectors 135, expanding foam packet positioners 1020, expanding foam packet activators 1025, trimmers 1030, a sealing mechanism 1035, a wrapping mechanism 1040, a labeling mechanism 1045, and imaging devices or scanners 1050, such as cameras, laser scanners, bar code readers, and RFID tag readers.

The controller 1005 comprises one or more standard programmable processors that perform arithmetic and logical operations necessary for the operation and control of the various other components. The controller 1005 has computer-readable storage medium and computer-readable storage media, such as read-only memory ("ROM"), non-volatile RAM ("NVRAM"), and/or a mass storage device. The ROM and/or NVRAM may store basic routines that help or serve to start up the controller 1005 and to transfer information between the various components and devices, and may also store other software components necessary for the operation of the controller 1005 in accordance with the embodiments described herein. The mass storage device provides non-volatile storage, for example, for system programs, application programs, and other program modules and data, product identification (bar code, RFID) tables, product information such as fragility, perishability, temperature limits, weight, center of gravity, and preferred orientation, customization information such as desired decorative package shape and/or labeling. Computer-readable storage media may include, for example, volatile and non-volatile, removable and non-removable media implemented in any method or technology such as, but not limited to, RAM, ROM, erasable programmable ROM ("EPROM"), electrically-erasable programmable ROM ("EEPROM"), flash memory or other solid-state memory technology, optical storage, magnetic cassettes, magnetic tape, magnetic disk storage or other magnetic storage devices, or any other medium that can be used to store the desired information.

The phrases "for example" and "such as" mean "by way of example and not of limitation." The subject matter described herein is provided by way of illustration for the purposes of teaching, suggesting, and describing, and not limiting or restricting. Combinations and alternatives to the illustrated embodiments are contemplated, described herein, and set forth in the claims. Various modifications and changes may be made to the subject matter described herein without strictly following the embodiments and applications illustrated and described, and without departing from the scope of the following claims.

What is claimed is:

1. A method of packaging a product for shipment, the method comprising:
    placing a product in an initial position on at least one of a platform or a base mold form;
    determining a desired center of gravity of a package for the product;
    determining a position of the product in the package to provide the desired center of gravity;
    advancing a moveable mold form toward the product, the moveable mold form being one of a plurality of moveable mold forms, individual moveable mold forms of the plurality of moveable mold forms having an aperture, the plurality of moveable mold forms, along with the at least one of the platform or the base mold form, defining a space, the product being within the space defined by the moveable mold form and the at least one of the platform or base mold form;
    introducing expanding foam through the aperture into the space defined by the moveable mold form and the at least one of the platform or base mold form;
    controlling a rate at which the expanding foam is introduced through at least one aperture of at least one moveable mold form to cause the expanding foam under the product to have a first thickness and the expanding foam above the product to have a second thickness, the first thickness and the second thickness providing the desired center of gravity of the package;
    allowing the expanding foam to at least partially harden with the product at least partially enclosed within the expanding foam, wherein the expanding foam becomes the package for shipping the product; and
    retracting the moveable mold form away from the package to release the package.

2. The method of claim 1, further comprising after retracting the moveable mold form, moving the package for further processing.

3. The method of claim 1, wherein the method further comprises:
    retracting at least some of the moveable mold forms away from the product as the expanding foam is introduced, wherein the expanding foam fills voids created as the moveable mold forms are retracted.

4. The method of claim 1, wherein each moveable mold form has a shell and a plurality of moveable pins within the shell, and at least some of the moveable pins having apertures for introduction of the expanding foam.

5. The method of claim 1, wherein each moveable mold form has a shell and a plurality of moveable pins within the shell, at least some of the moveable pins having apertures for introduction of the expanding foam, and at least some of the moveable pins being moveable independently of others of the moveable pins.

6. The method of claim 1, wherein at least one of the moveable mold forms is retracted at a different rate from a rate at which at least one other of the moveable mold forms is being retracted as the expanding foam is introduced.

7. The method of claim 1, wherein at least one of the moveable mold forms is retracted to a different distance from the product than a distance from the product to at least one other of the moveable mold forms.

8. The method of claim 1, further comprising determining a thickness of the package to protect the product, the thickness being based upon at least one of a weight of the product, a fragile nature of the product, an allowable temperature range of the product, a drop height during delivery, or a nature of delivery of the product.

9. A method of packaging a product for shipment, the method comprising:
    determining a desired center of gravity of a package containing a product;
    determining a position of the product in the package to provide the desired center of gravity;
    placing the product on a base mold form that supports the product in the position;
    advancing at least one moveable mold form of a plurality of moveable mold forms toward the product, at least some of the plurality of moveable mold forms having an aperture to provide a plurality of apertures;
    the plurality of moveable mold forms, along with the base mold form, defining a space in which the product is contained;
    introducing expanding foam through the plurality of apertures into the space;
    controlling a rate at which the expanding foam is introduced through the aperture of each moveable mold form to provide that the expanding foam under the product has a first thickness and the expanding foam above the product has a second thickness, the first thickness and the second thickness providing the desired center of gravity;
    allowing the expanding foam to at least partially harden with the product at least partially enclosed within the expanding foam, wherein the expanding foam becomes the package for shipping the product; and
    retracting the plurality of moveable mold forms away from the package to release the package.

10. The method of claim 9, further comprising, prior to advancing the moveable mold form toward the product, moving the product and the base mold form to a packaging station.

11. The method of claim 9, further comprising retracting at least some of the moveable mold forms away from the product as the expanding foam is introduced, wherein the expanding foam fills voids created as the at least some of the moveable mold forms are retracted.

12. The method of claim 9, further comprising identifying the moveable mold form for the product based upon at least one of: a weight of the product or a nature of the product.

13. The method of claim 9, wherein at least one of the moveable mold forms is retracted to a first distance from the product and a different moveable mold form is retracted to a second distance from the product, the second distance being different from the first distance.

14. A method of packaging a product for shipment, the method comprising:
- determining a desired center of gravity of a package containing a product;
- determining a desired thickness of the package to protect the product, the desired thickness being based upon a position of the product in the package and at least one of a weight of the product, a fragile nature of the product, an allowable temperature range of the product, a drop height during delivery of the product, or a nature of delivery of the product;
- determining the position of the product in the package to provide the desired center of gravity and the desired thickness;
- placing the product on a platform that supports the product in the position;
- moving the product and the platform to a packaging station;
- advancing a plurality of moveable mold forms toward the product, individual moveable mold forms of the plurality of moveable mold forms having an aperture to provide a plurality of apertures, the plurality of moveable mold forms, along with the platform, defining a space, the product being within the space defined by the moveable mold forms and the platform;
- introducing expanding foam through one or more of the apertures into the space defined by the plurality of moveable mold forms and the platform;
- controlling a rate at which the expanding foam is introduced through the plurality of apertures to cause the expanding foam under the product to have a first thickness and the expanding foam above the product to have a second thickness, the first thickness and the second thickness providing the desired center of gravity and at least the desired thickness;
- allowing the expanding foam to at least partially harden with the product at least partially enclosed within the expanding foam, wherein the expanding foam becomes at least part of the package for shipping the product; and
- retracting the plurality of moveable mold forms away from the package to release the package.

15. The method of claim 14, wherein the platform is part of the package.

16. The method of claim 14, wherein the product is lifted from the platform by at least some of the moveable mold forms as the at least some of the moveable mold forms are advanced so that the platform is not part of the package.

17. The method of claim 14, and further comprising moving the package to a next station.

18. The method of claim 17, wherein the next station comprises at least one of a trimming station, or a poly wrap station.

19. The method of claim 14, and further comprising retracting one or more of the plurality of moveable mold forms as the expanding foam is expanding to obtain the desired thickness of the package.

20. The method of claim 19, wherein the expanding foam fills voids created as one or more of the plurality of movable mold forms is retracted.

* * * * *